United States Patent
Wu

(10) Patent No.: US 9,640,896 B1
(45) Date of Patent: May 2, 2017

(54) PROTECTIVE MODULE FOR DATA TRANSMISSION PORT

(71) Applicant: HSING CHAU INDUSTRIAL CO., LTD., Taipei (TW)

(72) Inventor: Kuo-Ming Wu, Taipei (TW)

(73) Assignee: HSING CHAU INDUSTRIAL CO., LTD. (TW)

( * ) Notice: Subject to any disclaimer, the term of this patent is extended or adjusted under 35 U.S.C. 154(b) by 0 days.

(21) Appl. No.: 15/069,075

(22) Filed: Mar. 14, 2016

(30) Foreign Application Priority Data

Jan. 26, 2016 (TW) .............................. 105102414 A

(51) Int. Cl.
*H01R 13/60* (2006.01)
*H01R 13/443* (2006.01)
*H01R 11/30* (2006.01)

(52) U.S. Cl.
CPC .......... *H01R 13/443* (2013.01); *H01R 11/30* (2013.01)

(58) Field of Classification Search
CPC .............................. H01R 13/443; H01R 11/30
USPC ............. 439/38–39, 135–138, 141, 148–149
See application file for complete search history.

(56) References Cited

U.S. PATENT DOCUMENTS

| 4,950,842 | A * | 8/1990 | Menninga | H02G 3/14 174/67 |
| 8,435,041 | B2 * | 5/2013 | Holland | H01R 13/447 439/142 |
| 8,672,695 | B2 * | 3/2014 | Baldwin | H01R 13/4534 439/137 |
| 9,054,444 | B2 * | 6/2015 | Senatori | G06F 1/1633 |
| 9,287,665 | B2 * | 3/2016 | Watanabe | H01R 13/64 |

\* cited by examiner

*Primary Examiner* — Khiem Nguyen
(74) *Attorney, Agent, or Firm* — Schmeiser, Olsen & Watts, LLP

(57) ABSTRACT

A protective module for a data transmission port includes a plugging element and an unlocking element. The plugging element includes an extension portion and an end portion. The extension portion is inserted into the data transmission port. The end portion obstructs an opening of the data transmission port and is made of a first magnetically attracting material. The unlocking element includes an attraction portion adapted to attract the end portion and made of a second magnetically attracting material. The end portion of the plugging element escapes from the data transmission port as a result of magnetic attraction between the end portion of the plugging element and the unlocking element as soon as the unlocking element approaches the plugging element plugged into the data transmission port. Therefore, the protective module prevents external devices from getting connected to the data transmission port and prevents dust intrusion.

8 Claims, 6 Drawing Sheets

PROTECTIVE MODULE FOR DATA TRANSMISSION PORT

CROSS-REFERENCE TO RELATED APPLICATION

This non-provisional application claims priority under 35 U.S.C. §119(a) on Patent Application No(s). 105102414 filed in Taiwan, R.O.C. on Jan. 26, 2016, the entire contents of which are hereby incorporated by reference.

FIELD OF THE INVENTION

The present invention relates to a protective module adapted to be plugged into a data transmission port.

BACKGROUND OF THE INVENTION

In general, electronic devices, such as computers and servers, are equipped with multiple data transmission ports, including USB (Universal Serial Bus), Mini DisplayPort, and HDMI (High Definition Multimedia Interface). The data transmission ports are required for data transmission, because they admit and hold the connectors of cables connected to external electronic devices, and access-oriented devices, such as USB flash drives and USB hard disks.

To ensure data security or facilitate management, unauthorized persons are prohibited from accessing electronic devices, such as computers and servers in plenty of places, such as public spaces and offices. The related prior art entails filling the data transmission ports of electronic devices, such as computers and servers, with fillers, such as a hot glue, or adhering adhesives, such as an adhesive tape, to the data transmission ports, so as to close the data transmission ports. Although the aforesaid prior art is simple, it has a drawback, that is, difficulty in removing the fillers, such as a hot glue, and adhesives, such as an adhesive tape, from the otherwise closed data transmission ports.

SUMMARY OF THE INVENTION

It is an objective of the present invention to provide a protective module for use in obstructing data transmission ports of electronic devices, such as computers and servers, to not only prohibit external devices from being connected to the data transmission ports but also enhance ease of mounting and dismounting.

In order to achieve the above and other objectives, the present invention provides a protective module for a data transmission port, comprising a plugging element and an unlocking element. The plugging element comprises an extension portion and an end portion. The extension portion is inserted into the data transmission port. The end portion is adapted to obstruct an opening of the data transmission port and made of a first magnetically attracting material. The unlocking element comprises an attraction portion adapted to attract the end portion and made of a second magnetically attracting material. The end portion of the plugging element escapes from the data transmission port as a result of magnetic attraction between the end portion of the plugging element and the unlocking element as soon as the unlocking element approaches the plugging element plugged into the data transmission port.

Regarding the protective module, the extension portion has a slot, and a terminal plate of the data transmission port is inserted into the slot whenever the plugging element is plugged into the data transmission port.

Regarding the protective module, the unlocking element comprises a handle coupled to the attraction portion.

Regarding the protective module, the first magnetically attracting material is iron or stainless steel, and the second magnetically attracting material is magnet.

Regarding the protective module, the plugging element is integrally formed.

Therefore, in the embodiment of the present invention, the protective module for the data transmission port is characterized in that: a plugging element is plugged into a data transmission port to close an opening of the data transmission port such that no connector of cables connected to external electronic devices, and access-oriented devices, such as USB flash drives and USB hard disks, can be plugged into the data transmission port, so as to prevent unauthorized access to the data stored in the external electronic devices or access-oriented devices. Furthermore, in the embodiment of the present invention, the protective module can be plugged into any data transmission port which is temporarily not in use to thereby prevent intrusion of dust or dirt.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

The embodiment of the present invention is applied to block or obstruct an opening of a data transmission port of an electronic device, such as a computer or a server, such that no connector of cables connected to external electronic devices, and access-oriented devices, such as USB flash drives and USB hard disks, can be plugged into the data transmission port, so as to prevent unauthorized access to the data stored in the external electronic devices or access-oriented devices.

Figure 1:
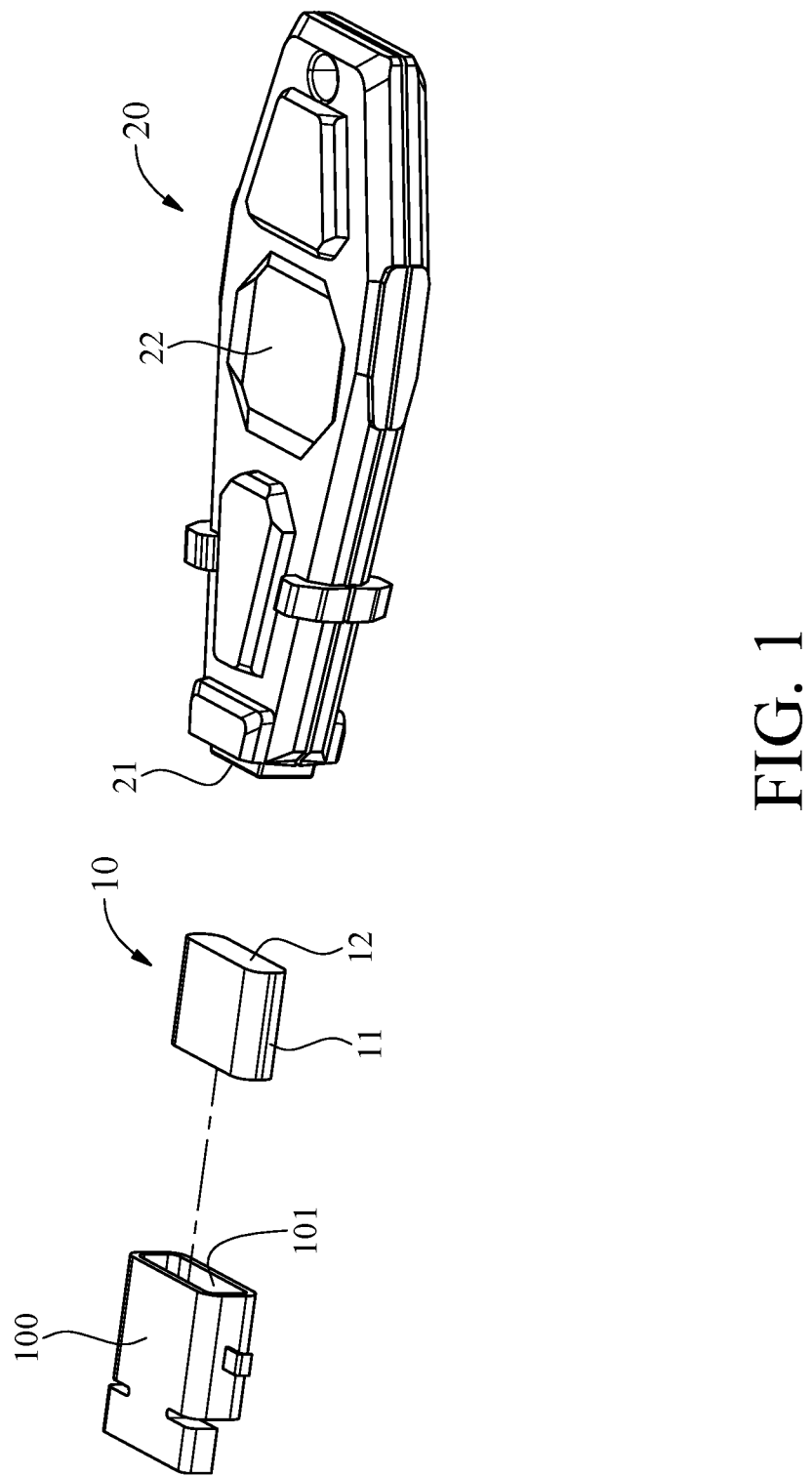
FIG. 1 is an exploded view of a protective module and a data transmission port according to an embodiment of the present invention.

Referring to FIG. 1, in this embodiment, a protective module for the data transmission port 100 comprises a plugging element 10 and an unlocking element 20.

In general, the data transmission port 100 is disposed on an electronic device (not shown), such as a computer or a server, and exemplified by USB (Universal Serial Bus), Mini DisplayPort, and HDMI (High Definition Multimedia Interface).

The plugging element 10 comprises an extension portion 11 and an end portion 12. The extension portion 11 is adapted to be inserted into the data transmission port 100. The end portion 12 is for use in obstructing an opening 101 of the data transmission port 100. The end portion 12 is made of a first magnetically attracting material.

The unlocking element 20 comprises an attraction portion 21 which attracts the end portion 12. The attraction portion 21 is made of a second magnetically attracting material.

If the unlocking element 20 approaches the plugging element 10 which is plugged into the data transmission port 100, the end portion 12 of the plugging element 10 will escape from the data transmission port 100 as a result of the magnetic attraction between the end portion 12 of the plugging element 10 and the unlocking element 20.

In the embodiment, preferably, the first magnetically attracting material is iron or stainless steel, and the second magnetically attracting material is magnet; hence, there is magnetic attraction between the end portion 12 of the plugging element 10 and the attraction portion 21 of the unlocking element 20, but the present invention is not limited thereto. In a variant embodiment, the first magnetically attracting material is magnet, whereas the second magnetically attracting material is iron or stainless steel. In another variant embodiment, both the first magnetically attracting material and the second magnetically attracting material are magnet, wherein the end portion 12 and the attraction portion 21 are respectively located at two magnetic poles between which there is magnetic attraction.

In this embodiment, the plugging element 10 corresponds in shape to the data transmission port 100 such that the plugging element 10 can obstruct the data transmission port 100. Preferably, the plugging element 10 does not fall into the data transmission port 100 for the sole reason of gravity, otherwise a mere vibration or fall of an electronic device, such as a computer or a server, can cause the plugging element 10 to escape from the data transmission port 100. Furthermore, the plugging element 10, which is integrally formed, has the end portion 12 disposed on a sidewall and the extension portion 11 disposed on a peripheral wall perpendicular to the sidewall, but the present invention is not limited thereto. In a variant embodiment, the plugging element 10 comprises various components, as long as the end portion 12 is made of the first magnetically attracting material, whereas the extension portion 11 is made of a material identical to or different from the first magnetically attracting material.

Figure 2:
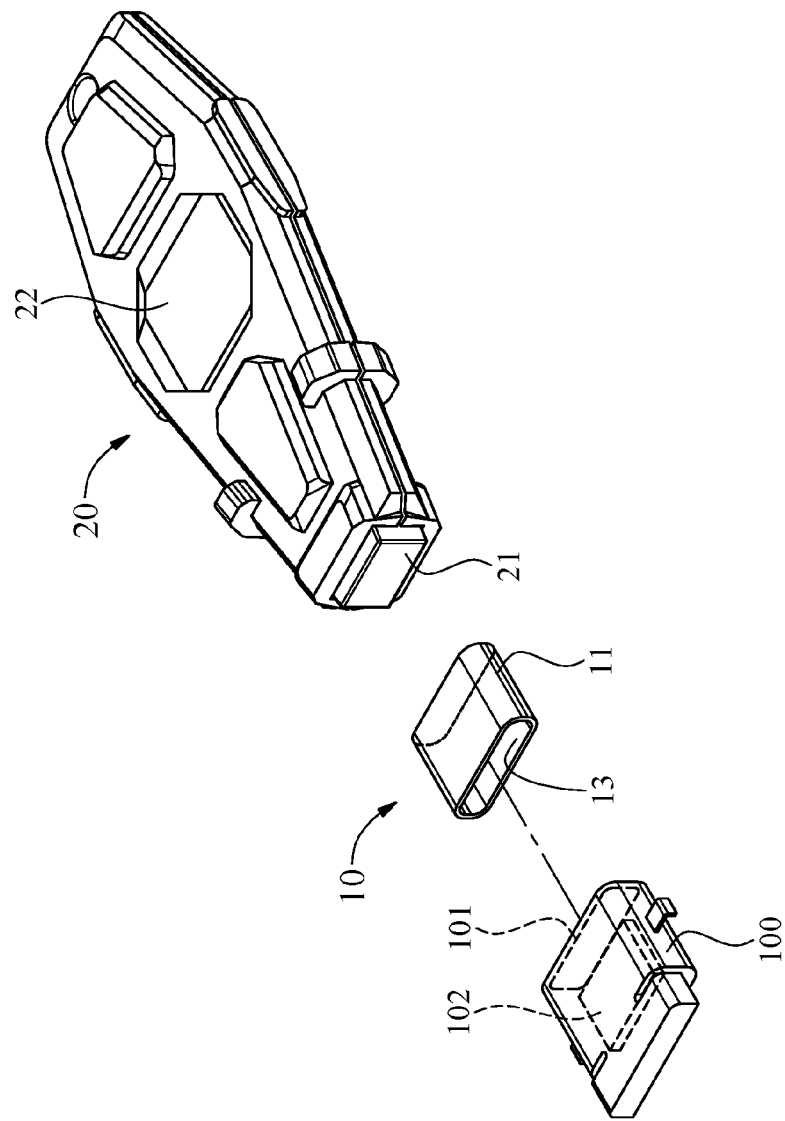
FIG. 2 is another exploded view of the protective module and the data transmission port according to the embodiment of the present invention.

Referring to FIG. 2, the extension portion 11 has a slot 13. A terminal plate 102 of the data transmission port 100 is inserted into the slot 13 as soon as the plugging element 10 is plugged into the data transmission port 100.

In the embodiment, the unlocking element 20 comprises a handle 22 coupled to the attraction portion 21. A user grips the handle 22 in order to move the attraction portion 21 toward the plugging element 10.

Figure 3:
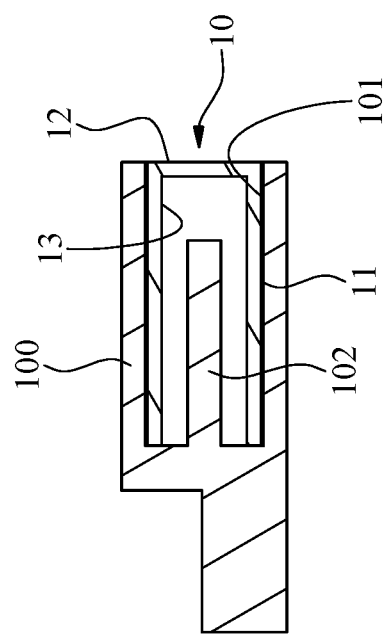
FIG. 3 is a schematic view of the operation of a plugging element plugged into the data transmission port according to the embodiment of the present invention.
Figure 4:
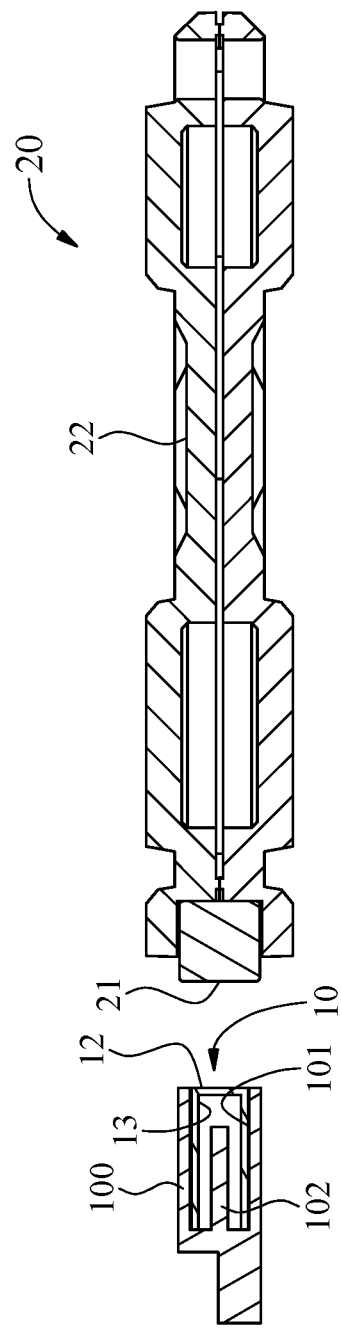
FIG. 4 is a schematic view of the operation of an unlocking element which approaches the plugging element plugged into the data transmission port according to the embodiment of the present invention.
Figure 5:
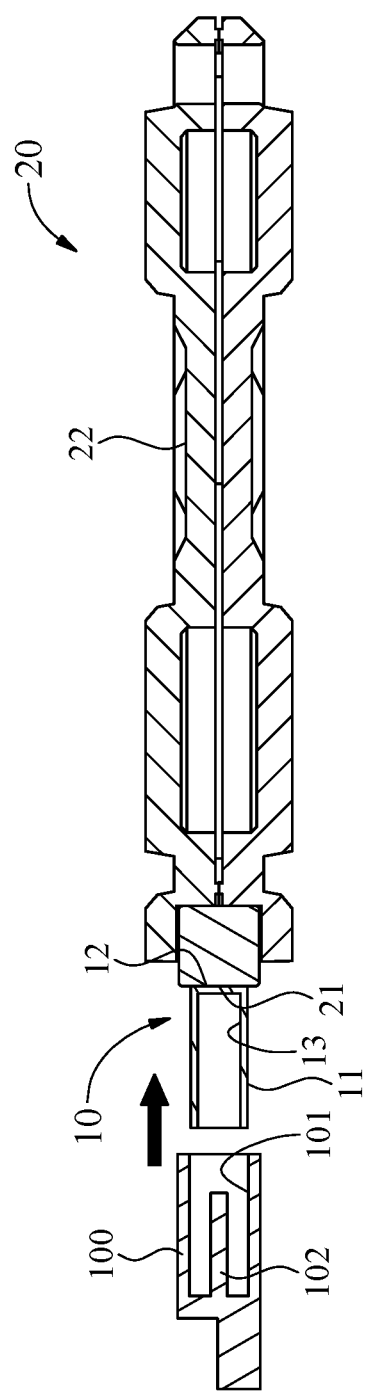
FIG. 5 is a schematic view of the operation of the plugging element which is attracted to the unlocking element to thereby escape from the data transmission port according to the embodiment of the present invention.

Referring to FIG. 3 through FIG. 5, there are shown schematic views of the operation of the protective module according to the embodiment of the present invention.

Referring to FIG. 3, the plugging element 10 is plugged into the data transmission port 100 to close the opening 101 of the data transmission port 100 such that no connector of cables connected to external electronic devices, and access-oriented devices, such as USB flash drives and USB hard disks, can be plugged into the data transmission port 100.

Referring to FIG. 4, to remove the plugging element 10, the user moves the attraction portion 21 of the unlocking element 20 toward the end portion 12 of the plugging element 10 such that the end portion 12 of the plugging element 10 gets attracted to the attraction portion 21 of the unlocking element 20, thereby subjecting the plugging element 10 to magnetic attraction.

Referring to FIG. 5, the plugging element 10 plugged into the data transmission port 100 escapes from the data transmission port 100 as a result of the magnetic attraction between the end portion 12 and the unlocking element 20. For illustrative purposes, after the attraction portion 21 has come into contact with the end portion 12, the plugging element 10 is adsorbed to the attraction portion 21, and then the user moves the unlocking element 20 in a direction away from the data transmission port 100, thereby pulling the plugging element 10 out of the data transmission port 100. Preferably, the second magnetically attracting material is magnet capable of generating strong magnetic forces under which the attraction portion 21 brings about sufficient magnetic attraction without coming into contact with the end portion 12, so as to remove the plugging element 10 from the data transmission port 100.

Figure 6:
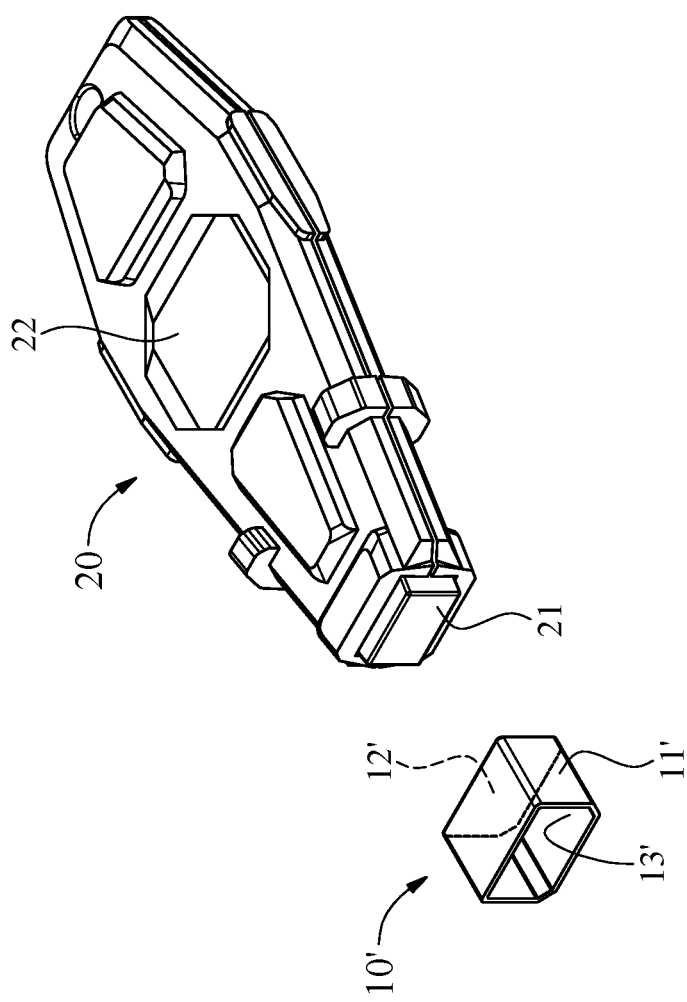
FIG. 6 is a schematic view of the protective module according to another embodiment of the present invention.

In the embodiment of the present invention, the protective module is applicable to data transmission ports which come with various transmission interfaces, such as USB (Universal Serial Bus), Mini DisplayPort, and HDMI (High Definition Multimedia Interface); accordingly, the plugging element corresponds in shape to the data transmission port. Referring to FIG. 6, for illustrative purposes, a plugging element 10' is applicable to a data transmission port whose transmission interface is Mini DisplayPort, whereas an extension portion 11' is inserted into the data transmission port, with an end portion 12' adapted for use in obstructing an opening of the data transmission port, wherein a terminal plate of the data transmission port is inserted into a slot 13' as soon as the plugging element 10' is plugged into the data transmission port.

Therefore, in the embodiment of the present invention, the protective module for the data transmission port is characterized in that: a plugging element is plugged into a data transmission port to close an opening of the data transmission port such that no connector of cables connected to external electronic devices, and access-oriented devices, such as USB flash drives and USB hard disks, can be plugged into the data transmission port, so as to prevent unauthorized access to the data stored in the external electronic devices or access-oriented devices. Furthermore, in the embodiment of the present invention, the protective module can be plugged into any data transmission port which is temporarily not in use to thereby prevent intrusion of dust or dirt.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A protective module for a data transmission port, comprising:
    a plugging element comprising an extension portion and an end portion, with the extension portion inserted into the data transmission port, wherein the end portion is adapted to obstruct an opening of the data transmission port and made of a first magnetically attracting material; and an unlocking element comprising an attraction portion adapted to attract the end portion and made of a second magnetically attracting material, wherein the end portion of the plugging element escapes from the data transmission port as a result of magnetic attraction between the end portion of the plugging element and the unlocking element as soon as the unlocking element approaches the plugging element plugged into the data transmission port.

2. The protective module of claim 1, wherein the extension portion has a slot, and a terminal plate of the data transmission port is inserted into the slot whenever the plugging element is plugged into the data transmission port.

3. The protective module of claim 1, wherein the unlocking element comprises a handle coupled to the attraction portion.

4. The protective module of claim 2, wherein the unlocking element comprises a handle coupled to the attraction portion.

5. The protective module of claim 3, wherein the first magnetically attracting material is one of iron and stainless steel, and the second magnetically attracting material is magnet.

6. The protective module of claim 4, wherein the first magnetically attracting material is one of iron and stainless steel, and the second magnetically attracting material is magnet.

7. The protective module of claim 5, wherein the plugging element is integrally formed.

8. The protective module of claim 6, wherein the plugging element is integrally formed.

\* \* \* \* \*